United States Patent
Sharma et al.

(10) Patent No.: US 12,339,814 B2
(45) Date of Patent: Jun. 24, 2025

(54) ON-DEMAND VIRTUAL STORAGE ACCESS METHOD ANALYTICS

(71) Applicant: Accenture Global Solutions Limited, Dublin (IE)

(72) Inventors: Pragya C. Sharma, Mumbai (IN); Ritu Pramod Dalmia, Mumbai (IN); Vikas Obaiah Pujar, Bangalore (IN); Soubhagya Mishra, Bhubaneswar (IN); Pawan Kumar Mishra, Bangalore (IN); Manish Bachhania, Mumbai (IN); Shalini F. Gupta, Pune (IN); Nilesh D. Gupta, Jaipur (IN)

(73) Assignee: Accenture Global Solutions Limited, Dublin (IE)

( * ) Notice: Subject to any disclaimer, the term of this patent is extended or adjusted under 35 U.S.C. 154(b) by 308 days.

(21) Appl. No.: 17/677,701

(22) Filed: Feb. 22, 2022

(65) Prior Publication Data
US 2023/0267102 A1 Aug. 24, 2023

(51) Int. Cl.
*G06F 16/188* (2019.01)
*G06F 16/14* (2019.01)
*G06F 16/16* (2019.01)
*G06F 16/25* (2019.01)

(52) U.S. Cl.
CPC .......... *G06F 16/188* (2019.01); *G06F 16/148* (2019.01); *G06F 16/162* (2019.01); *G06F 16/258* (2019.01)

(58) Field of Classification Search
CPC .............................. G06F 16/188; G06F 16/258
See application file for complete search history.

(56) References Cited

U.S. PATENT DOCUMENTS 5,432,930 A 7/1995 Song
6,253,236 B1 * 6/2001 Troxel .................... H04L 67/01
710/200

(Continued)

FOREIGN PATENT DOCUMENTS

WO WO 2005083588 9/2005

OTHER PUBLICATIONS

IBM.com [online], "Using the Data Mapping Facility (DMF)," last updated Mar. 2, 2021, retrieved on May 24, 2022, retrieved from URL<https://www.ibm.com/docs/en/izoda/1.1.0?topic=files-using-data-mapping-facility-dmf>, 1 page.

(Continued)

*Primary Examiner* — Marc S Somers
(74) *Attorney, Agent, or Firm* — Polsinelli PC

(57) ABSTRACT

Implementations are directed to receiving, by an application, query data, the query data indicating a conditional query and a selection of files on which to execute the conditional query; identifying a subset of selected files for which copies of the selected files are not stored in a file database of the application; extracting, from a file system, a copy of each file of the subset of selected files into the file database of the application; parsing the copies of the selected files from the file database into a dataframe; executing the conditional query on the selected files in the dataframe; and providing a result of the conditional query. Actions include executing, by a discovery engine, a discovery process to provide metadata comprising, for a file in the file system: a name of the file; corresponding column names and data types; and a file alias.

16 Claims, 6 Drawing Sheets

(56) References Cited

U.S. PATENT DOCUMENTS

| | | | | |
|---|---|---|---|---|
| 2002/0133504 | A1* | 9/2002 | Vlahos | G06F 16/256 |
| 2003/0101277 | A1* | 5/2003 | Crump | H04L 69/162 |
| | | | | 709/238 |
| 2004/0117382 | A1* | 6/2004 | Houseknecht | G06F 9/45512 |
| 2004/0236726 | A1* | 11/2004 | Ewing | G06F 16/24552 |
| 2005/0192962 | A1* | 9/2005 | Furrer | G06F 16/972 |
| 2006/0277164 | A1* | 12/2006 | Smith | G06F 16/245 |
| 2017/0132293 | A1* | 5/2017 | Bourbonnais | G06F 16/245 |
| 2018/0150548 | A1* | 5/2018 | Shah | G06F 16/285 |
| 2018/0349433 | A1* | 12/2018 | Baines | G06F 16/258 |

OTHER PUBLICATIONS

CodeProject.com [online], "Loading CSV and SQL Data into Pandas," May 29, 2020, retrieved on Jun. 26, 2023, retrieved from URL<https://www.codeproject.com/Articles/5269218/Loading-CSV-and-SQL-Data-into-Pandas>, 6 pages.

Doi et al., "ToT for CSV: accessing open data CSV files through SQ," Presented at iiWAS2019: Proceedings of the 21st International Conference on Information Integration and Web-based Applications & Services, Munich, Germany, Dec. 2-4, 2019, 423-429.

Extended Search Report in European Appln. No. 22197433.0, dated Jul. 5, 2023, 8 pages.

Spark.Apache.org [online], "Spark SQL, DataFrames and Datasets Guide," available on or before Sep. 2, 2016 via Internet Archive: Wayback Machine URL<https://web.archive.org/web/20160902190135/http://spark.apache.org/docs/2.0.0/sql-programming-guide.html>, retrieved on Oct. 17, 2017, retrieved from URL<https://web.archive.org/web/20160902190135/http://spark.apache.org/docs/2.0.0/sql-programming-guide.html>, 29 pages.

* cited by examiner

ON-DEMAND VIRTUAL STORAGE ACCESS METHOD ANALYTICS

BACKGROUND

Virtual Storage Access Method (VSAM) is an access method that can be used to organize data as files in mainframes. VSAM can be used without requiring dedicated database administrators to maintain VSAM file systems. VSAM can support indexing and multiple access patterns (e.g., sequential, random, dynamic). VSAM files can be independent files with no relational dependencies. Using VSAM, an enterprise can organize records in a file in physical sequence (the sequential order that they were entered), logical sequence using a key (e.g., employee ID number), or by the relative record number on direct access storage devices (DASD).

VSAM methods can have limitations. For example, analysis of VSAM files can require common business-oriented language (COBOL), job control language (JCL), and other legacy languages. In some examples, performance can be slow because of index complexity. VSAM can have performance constraints compared to relational database management system (RDBMS) for large datasets. In some examples, concurrent access is not supported and there is a lack of conditional querying support. In some examples, there is no true metadata (e.g., data relationships) or data dictionary concept for VSAM.

SUMMARY

Implementations of the present disclosure are directed to a Virtual Storage Access Method (VSAM) analytics framework. More particularly, implementations of the present disclosure are directed to a VSAM analytics framework that enables self-serve on-demand analytics to be executed on VSAM data within mainframes. The VSAM analytics framework can perform analytics on multiple VSAM files, while reducing cycle time and MIPS consumption.

The disclosed techniques can be used to discover metadata information of the VSAM files using job control language (JCL) code and copybooks. The VSAM analytics framework provides a metadata catalog through discovery. The metadata files of the catalog represent the data that is available in VSAM files. Data can be parsed from the VSAM files into tables using schema information from the copybooks. Conditional queries can be run on the parsed tables for on-demand analytics. The framework enables conditional queries to run on VSAM data and can combine data from two or more VSAM files. The framework can operate on Unix System Services (USS) instead of z/OS, an operating system for IBM z/Architecture mainframes. Operating the framework on USS can reduce contribution to million instructions per second (MIPS) and reduce the time consumed for serving on-demand analytical requests for VSAM data. The framework can retain data on the mainframes and in VSAM files without moving the data to any relational database mainframe system (RDBMS) system thus removing the need for continuous data replication and ensuring high data security on the mainframe. Additionally, the framework maintains data integrity by preventing direct access to production data.

In some implementations, actions include receiving, by an application, query data, the query data indicating a conditional query and a selection of files on which to execute the conditional query; identifying a subset of selected files for which copies of the selected files are not stored in a file database of the application; extracting, from a file system, a copy of each file of the subset of selected files into the file database of the application; parsing the copies of the selected files from the file database into a dataframe; executing the conditional query on the selected files in the dataframe; and providing a result of the conditional query.

Other implementations of this aspect include corresponding systems, apparatus, and computer programs, configured to perform the actions of the methods, encoded on computer storage devices.

These and other implementations can each optionally include one or more of the following features: the actions further include executing, by a discovery engine, a discovery process to provide metadata comprising, for a file in the file system: a name of the file; corresponding column names and data types; and a file alias; the actions further include generating, by the discovery engine and from the metadata, a metadata catalog representing files in the file system; parsing the copies of the selected files from the file database into a dataframe comprises: obtaining, from a metadata catalog representing files in the file system, schema information; and parsing the copies of the selected files into tables using the schema information; the actions include: storing, by the application, historical query data including query data received over time; the actions include: based on determining that at least a threshold amount of time has passed after extracting a copy of a particular selected file into the file database, deleting, from the file database, the copy of the particular selected file; executing the conditional query on the selected files in the dataframe comprises executing the conditional query on combined data from two or more of the selected files; the application comprises a UNIX Systems Services (US S); the file system is hosted by an operating system; the operating system comprises z/OS; the application and the operating system operate within the mainframe system; the dataframe comprises a Python dataframe; the file system comprises a Virtual Storage Access Method (VSAM) file system; the files are stored on a direct access storage device (DASD).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

These and other implementations can be implemented to achieve the following advantages. In some examples, the disclosed techniques enable on-demand conditional querying on VSAM data while maintaining integrity and security of VSAM data, without the need for continuation data replication. Cycle time can be reduced up to 90% for on-demand analytics. MIPS consumption can be reduced up to 60% compared to other methods that run on z/OS instead of USS. Compliance reporting development cycle time can be reduced (e.g., from months to days). The disclosed techniques can enable non-sequential read on entry sequential dataset (ESDS) type VSAM files, resulting in faster data access.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
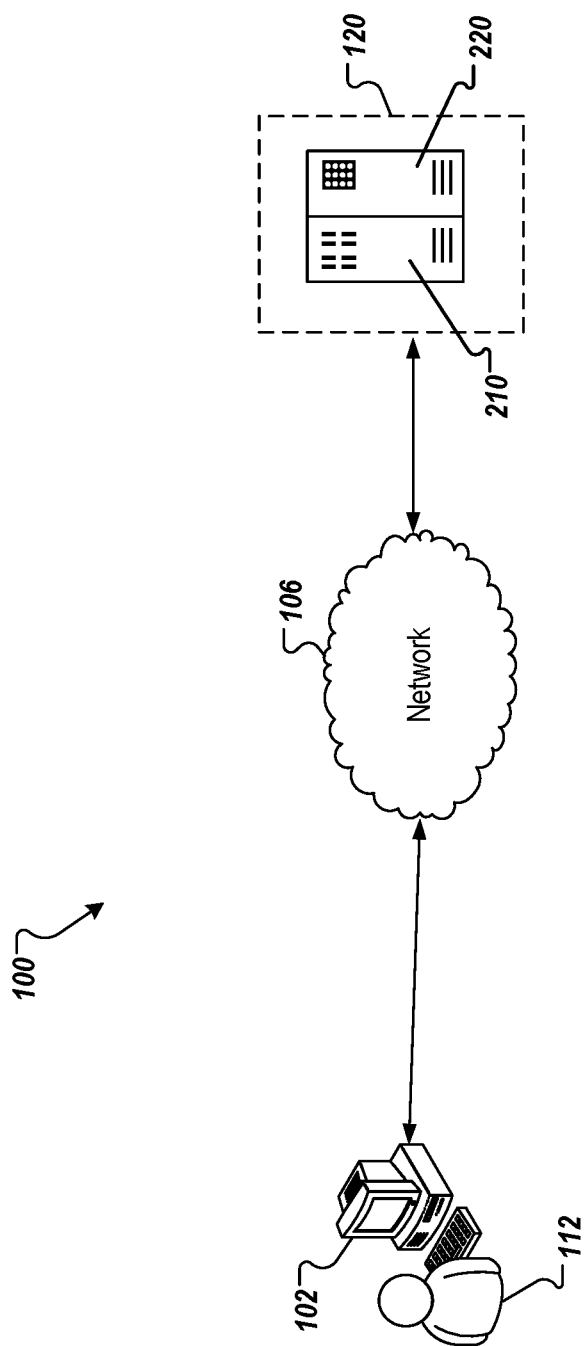
FIG. 1 depicts an example architecture that can be used to execute implementations of the present disclosure.

Implementations of the present disclosure are directed to a Virtual Storage Access Method (VSAM) analytics framework. More particularly, implementations of the present disclosure are directed to a VSAM analytics framework that enables self-serve on-demand analytics on VSAM data on mainframes. As described herein, the VSAM analytics framework of the present disclosure may include a set of components (each component being provided as one or more computer-executable programs) that execute functionality to execute conditional queries on parsed VSAM data on Unix System Services (USS). The VSAM analytics framework can perform analytics on multiple VSAM files while reducing cycle time and MIPS consumption.

The disclosed techniques can be used to discover metadata information of the VSAM files using job control language (JCL) code and copybooks. The VSAM analytics framework provides a metadata catalog through discovery. The metadata files of the catalog represent the data that is available in VSAM files. Data can be parsed from the VSAM files into tables using schema information from the copybooks. Conditional queries can be run on the parsed tables for on-demand analytics. The framework enables conditional queries to run on VSAM data and can combine data from two or more VSAM files. The framework can operate on USS instead of z/OS in order to reduce contribution to million instructions per second (MIPS) and to reduce the time consumed for serving on-demand analytical requests for VSAM data. The framework can retain data on the mainframes and in VSAM files without moving the data to any relational database mainframe system (RDBMS), thus removing the need for continuous data replication and ensuring high data security on the mainframe. Additionally, the framework maintains data integrity by preventing direct access to production data.

To provide context for implementations of the present disclosure, and as introduced above, VSAM is an access method to organize data as files in mainframes. VSAM can be used without requiring dedicated database administrators to maintain VSAM file systems. VSAM can support indexing and multiple access patterns (e.g., sequential, random, dynamic). VSAM files can be independent files with no relational dependencies. Using VSAM, an enterprise can organize records in a file in physical sequence (the sequential order that they were entered), logical sequence using a key (e.g., employee ID number), or by the relative record number on direct access storage devices (DASD)

VSAM methods can have limitations. For example, analysis of VSAM files can require common business-oriented language (COBOL), JCL, and other legacy languages. In some examples, performance can be slow because of index complexity. VSAM can have performance constraints compared to RDBMS for large datasets. In some examples, concurrent access is not supported and there is a lack of conditional querying support. In some examples, there is no true metadata (e.g., data relationships) or data dictionary concept for VSAM.

VSAM reports and insights can require several days. In some examples, average cycle time for on-demand reports and insights can range from two to eight days. Additionally, transactions using Easytrieve, COBOL, IBM Data Virtualization Manager, and iZODA transactions require high MIPS and complex code generation. Therefore, release cycle time for new or updated compliance reports can take up to several months.

In some examples, VSAM analytics can be performed by migrating data to RDBMS outside of a mainframe, such as Oracle, Db2, and RedShift. Offloading data to RDBMS outside of the mainframe can result in reduced security, data privacy concerns, reduced horsepower performance, and reduced robustness and stability. Offloading data also requires large amounts of data duplication and continuous change data capture. Thus, the ability to perform VSAM analytics without migrating data outside of the mainframe results in improved security and privacy, higher horsepower, and improved robustness, without the need for data duplication.

In some examples, VSAM analytics can be performed by migrating data to RDBMS on the mainframe, such as DB2 z/OS. Moving data to RDBMS on the mainframe can result in increased consumption of MIPS. Moving data to RDBMS on the mainframe also requires data duplication and therefore an increased need for storage and a need for continuous change capture. Thus, the ability to perform VSAM analytics without migrating data to RDBMS on the mainframe results in reduced consumption of MIPS and reduced need for storage without the need for continuous change capture.

In view of the above context, implementations of the present disclosure are directed to providing a metadata catalog through discovery, parsing data from the VSAM files into tables, and running conditional queries on the parsed tables for on-demand analytics. The disclosed implementations allow for retaining VSAM data on mainframes and enabling on-demand analytics on multiple VSAM files while improving cycle speed, security, efficiency, and MIPs consumption, compared to other methods of performing VSAM analysis, such as those that require migrating data off of the mainframe, and those that require migrating data to an RDBMS on the mainframe.

Implementations of the present disclosure are described in further detail herein with reference to example entities (e.g., systems, languages, and the like). Example entities, among others referenced herein, include the z/OS mainframe operating system (OS), the Db2 family of data management products, including the Db2 relational database system provided by IBM, the Kafka messaging framework provided by Apache, structured query language (SQL), Java, and Python. It is contemplated, however, that implementations of the present disclosure can be realized with any appropriate entities.

FIG. 1 depicts an example architecture 100 in accordance with implementations of the present disclosure. In the depicted example, the example architecture 100 includes a client device 102, a network 106, and a mainframe system 120. The mainframe system 120 includes one or more server devices and databases (e.g., processors, memory). In the depicted example, a user 112 interacts with the client device 102.

In the example of FIG. 1, a mainframe system 120 is depicted. The mainframe system 120 represents a system that includes one or more mainframes that support operations of an enterprise. In accordance with implementations of the present disclosure, and as noted above, the mainframe system 120 can host an on-demand VSAM analytics framework. As described in further detail herein, the VSAM analytics framework of the present disclosure includes a set of components, each component provided as one or more computer-executable programs. Example components include a discovery engine, an analytics engine, and a dataframe.

The mainframe system 120 includes a USS instance 210 and a z/OS 220. The USS instance 210 and a z/OS 220 operate on the mainframe system 120. In some implementations, the z/OS 220 operates as a host operating system and the USS instance 210 operates as a guest operating system.

In some examples, the client device 102 can communicate with the mainframe system 120 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

Figure 2:
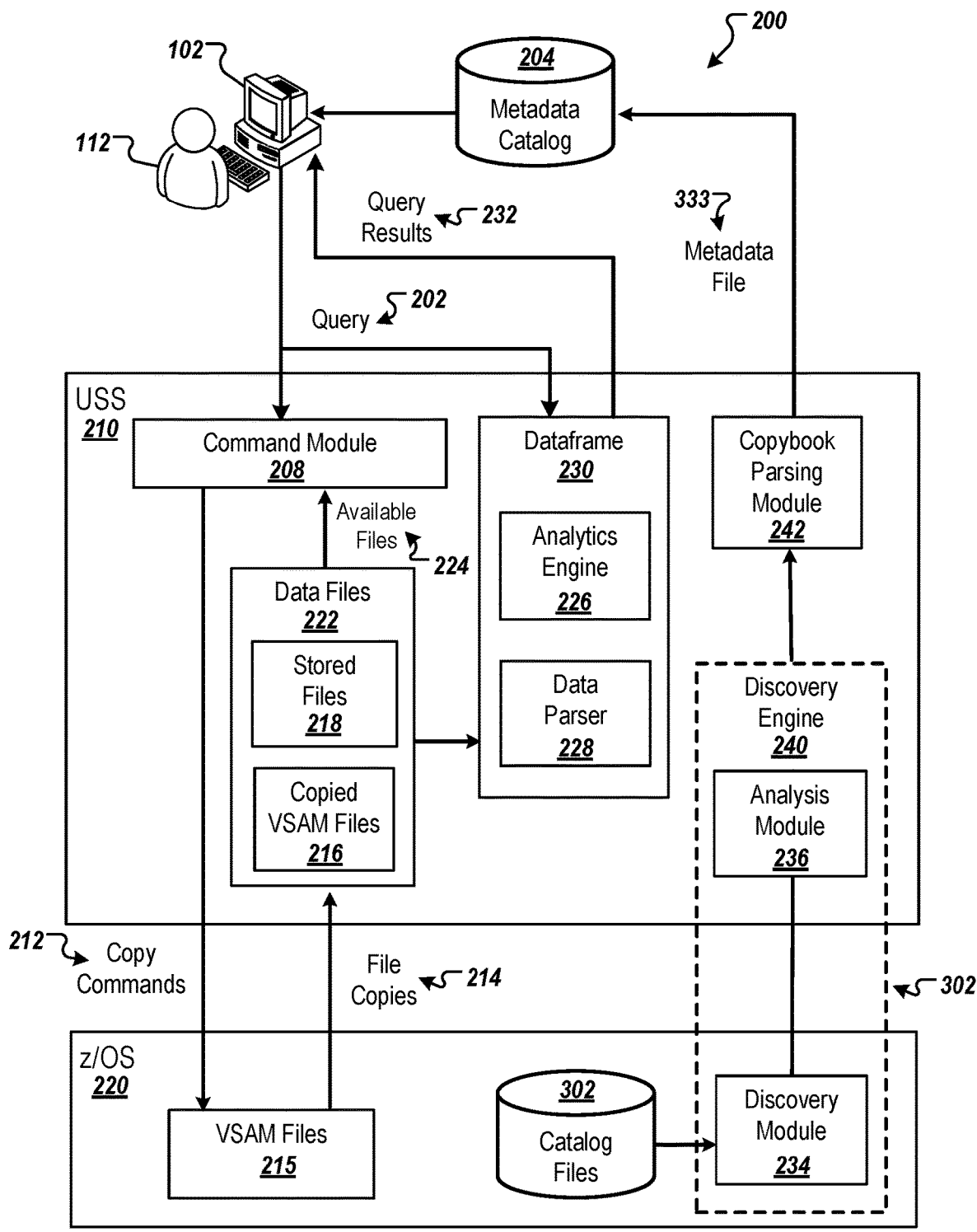
FIG. 2 depicts a conceptual architecture including an on-demand Virtual Storage Access Method (VSAM) analytics framework in accordance with implementations of the present disclosure.

FIG. 2 depicts a conceptual architecture of an on-demand VSAM analytics framework in accordance with implementations of the present disclosure. The conceptual architecture 200 includes the USS instance 210 and the z/OS 220. The USS 210 includes a command module 208, data files 222, a dataframe 230, and a discovery engine 240. The z/OS 220 hosts the VSAM files 215. In some examples, both the USS 210 and the z/OS 220 are executed within a mainframe computing system.

The discovery engine 240 performs discovery to build a metadata catalog 204. The discovery engine 240 includes a discovery module 234 and an analysis module 236. The discovery module 234 retrieves names of VSAM files 215 from catalog files 302. The analysis module 236 performs analysis on the discovered files in order to output metadata files 333. Operations of the discovery engine 240 are described in greater detail with reference to FIG. 3.

In the example of FIG. 2, the user 112 submits a query 202. The query 202 can include a request for analytics results. The USS 210 receives the query 202. In some examples, the query 202 includes a conditional query. The conditional query can include one or more conditional clauses that restrict the query to certain portions of data. For example, rows of a data table can be selected based on satisfying the conditional clause of the conditional query. In some examples, the query 202 indicates a selection of files on which to execute the conditional query.

In some examples, the metadata catalog 204 is presented to the user 112 through the client device 102. The user 112 can refer to the metadata catalog 204 while providing the query 202. As part of metadata, the user 112 can discover, for different VSAM files, which VSAM files contain which data, how many columns are in the VSAM files, which columns are in the VSAM files, and data types that are in the VSAM files. The user 112 can prepare an SQL statement by providing the VSAM file columns as column name, and the VSAM file name as table name. The user 112 can thus select files on which to run analysis and write conditional queries.

The USS 210 stores data files 222. The data files 222 can include stored files 218 and copied VSAM files 216. The command module 208 can receive the query 202 and determine which files are indicated by the query 202. For example, the command module 208 can decompose the query 202 to extract VSAM files names from the query. The command module 208 can then determine whether each file indicated by the query is stored in the data files 222.

The command module 208 can receive data indicating available files 224. The available files 224 are files that are stored in data files 222 of the USS 210. The available files 224 can be, for example, files that have been previously retrieved or copied from the VSAM files 215.

The command module 208 can identify a subset of selected files for which copies of the selected files are not stored in the data files 222 of the USS 210. The command module 208 generates copy commands 212. In some examples, the command module 208 can execute the copy commands 212 using shell scripts. The copy commands 212 can include commands to copy selected files from the VSAM files 215 to the data files 222 of the USS 210. The copy commands 212 can include instructions to copy files that are not included in the available files 224. The files can be copied, for example, using the Linux copy command. The command can be executed via a shell script for required scheduling and automation.

In this way, the command module 208 can perform on-demand extraction from the VSAM files 215 in order to make efficient use of storage by the USS 210. Using the copy commands 212, the command module 208 extracts, from the VSAM files 215, a copy of each file of the subset of selected files into the data files 222 of the USS 210.

In some examples, the VSAM files 215 are stored on DASD (Direct Access Storage Device) that is hosted by an operating system, the z/OS 220 in the example of FIG. 2. The USS 210 retrieves file copies 214 to the data files 222. The file copies 214 are copies of VSAM files 215 that were selected and retrieved by the copy commands 212. The file copies 214 are stored as copied VSAM files 216.

The dataframe 230 includes a data parser 228 and an analytics engine 226. In some examples, the dataframe 230 is a Python dataframe. The dataframe 230 can include a data structure for manipulating tables and time series. The dataframe 230 can perform data alignment, dataset merging and joining, data filtration, data structure column insertion and deletion, and reading and writing between in-memory data structure and different file formats.

The data parser 228 parses the copies of the copied VSAM files 216 from the data files 222 into the dataframe 230. Operations of the data parser 228 are described in greater detail with reference to FIG. 4.

The analytics engine 226 executes the conditional query on the selected files in the dataframe 230. In some examples, executing the conditional query on the selected files in the dataframe 230 includes executing the conditional query on combined data from two or more of the selected files. Operations of the analytics engine 226 are described in greater detail with reference to FIG. 5.

The analytics engine 226 provides query results 232 to the client device 102. The query results 232 include results of the conditional query received from the user 112. In some examples, the USS 210 stores historical query data including query data received over time. For example, the USS 210 can store request details from received conditional queries. Query data can be captured and stored over a period of time (e.g., weeks, months, years). The request details can be stored in order to capture data access patterns.

In some examples, data access patterns can be evaluated to inform future updates and to predict future queries. For example, a first type of query may be routinely received (e.g., at the beginning of each month over the course of six months). Based on this access pattern, the command module 208 can perform analysis to predict that the first type of query will likely be received at the beginning of each month in the future. Based on the prediction, the command module 208 can perform an action, such as pre-generating applicable copy commands 212 and/or pre-issuing the copy commands 212 that are associated with the first type of query. Thus, the US S 210 can obtain the corresponding file copies 214 prior to receiving the query 202, or can obtain the corresponding file copies 214 more quickly after receiving the query 202.

In some examples, the USS 210 can delete copied VSAM files 216 after a period of time. Thus, the USS 210 can perform temporary data duplication of the selected VSAM files. In some examples, the USS 210 can delete a copied VSAM file after a threshold period of time has expired since the VSAM filed was copied to the USS 210. In some examples, the threshold period of time is defined by a user (e.g., the user 112). In some examples, based on determining that at least a threshold amount of time has passed after extracting a copy of a particular selected VSAM file into the file database, the USS 210 can delete the copy of the particular selected VSAM file from the data files 222.

In some examples, the USS 210 can occasionally or periodically delete all copied VSAM files 216. For example, the USS 210 may delete all copied VSAM files 216 at intervals (e.g., of weeks, months). In some examples, the USS 210 can delete all copied VSAM files 216 on-demand (e.g., in response to receiving a request from a user to delete all copied VSAM files 216). In some examples, the USS 210 can delete some or all VSAM files 216 based on a storage capacity of the USS 210. For example, the USS 210 can determine that the copied VSAM files 216 occupy greater than a threshold amount of storage capacity, and in response, delete some or all of the copied VSAM files 216.

In some examples, the USS 210 can select to delete a subset of the copied VSAM files 216 based on a time that the files were copied to the USS 210, based on a frequency of querying the files, or based on other criteria. For example, the USS 210 can select to delete a subset of the copied VSAM files 216 based on determining that the subset of files includes files that were copied at an earlier time than other copied VSAM files 216. In another example, the USS 210 can select to delete a subset of the copied VSAM files 216 based on determining that the subset of files includes files that are queried less frequency than other copied VSAM files 216.

Figure 3:
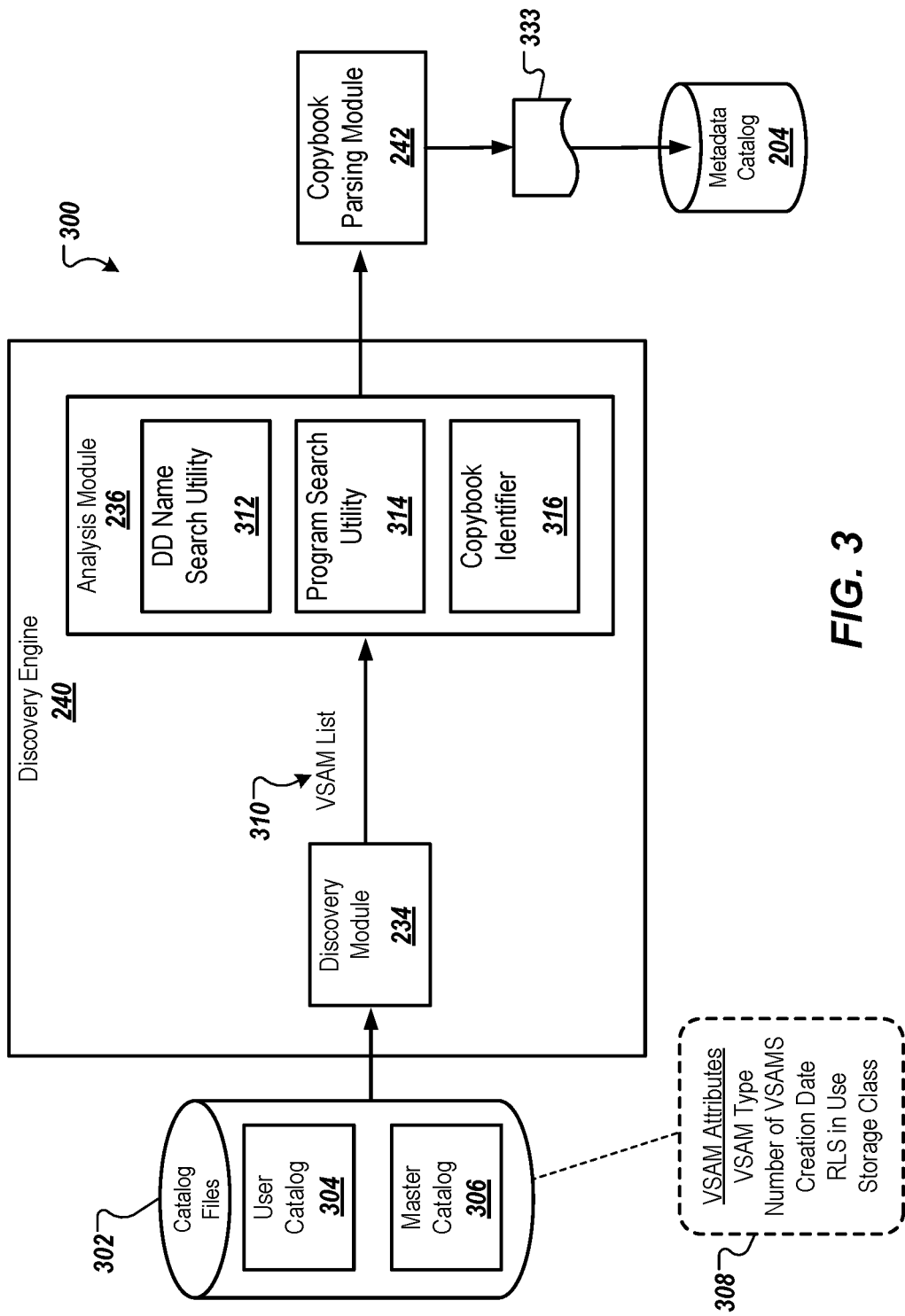
FIG. 3 depicts an example technical implementation of a discovery engine in accordance with implementations of the present disclosure.

FIG. 3 depicts an example technical implementation 300 of a discovery engine in accordance with implementations of the present disclosure. In the example of FIG. 3, the example technical implementation 300 includes catalog files 302, the discovery engine 240 including the discovery module 234 and the analysis module 236, the copybook parsing module 242 and the metadata catalog 204.

The catalog files 302 include a user catalog 304 and a master catalog 306. The user catalog 304 and master catalog 306 can include flat/sequential files. The catalog files 302 can include data representing VSAM attributes 308 in an unstructured format. The VSAM attributes 308 include, for example, VSAM type, number of VSAMS, creation date, record level sharing (RLS) in use, and storage class. The catalog files 302 can be retrieved using time sharing option (TSO) commands.

The discovery engine 240 executes a discovery process to provide metadata files 333. The discovery module 234 extracts the VSAM file names from the catalog files 302. The analysis engine 236 then uses the VSAM file names to identify the associated copybook within the z/OS system. The identified copybook is passed to the copybook parsing module 242, which generates metadata details (metadata files 333) for the VSAM file. The copybook parsing module 242 parses the copybook identified by the discovery engine and generates details which include the fields of the copybooks and their data types. These details are stored in the metadata catalog 204.

The fields of the copybook map to the column name of the table by which the VSAM will be referred to in the user's query 202. The metadata files 333, output by the copybook parsing module 242, can include for a file in the VSAM file system: the VSAM File name, corresponding column names and data types, and VSAM file aliases. The metadata files 333 can also include the table name by which the VSAM will be referred in the SQL query. The metadata files 333 can be stored in the metadata catalog 204. The metadata catalog 204 therefore includes a catalog of files representing the VSAM files 215 stored by the z/OS 220.

In some examples, the discovery module 234 runs a discovery script. The discovery script can be, for example, a JCL script. The discovery module 234 can access the master catalog 306 and the user catalog 304 and identify the VSAM files. The discovery module 234 generates a VSAM list 310 that can be stored in flat/sequential files (e.g., in a JCL library).

For each VSAM, the analysis module 236 can scan the JCL library for VSAM file usage and use the data definition (DD) name to identify the COBOL program and associated copybook for the VSAM. The analysis module 236 includes a DD name search utility 312, program search utility 314, and copybook identifier 316.

The DD name search utility 312 can scan the JCL library to collect DD names for the VSAMS being used in jobs in the catalog files 302. The DD name search utility 312 identifies the JCLs using the VSAM files and generates a list of DD names of the VSAM files.

The program search utility 314 searches in the COBOL library to identify programs using the VSAM files, as identified by the respective DD names. The program search utility searches a source code repository on the mainframe to identify the programs that are using the DD names.

The copybook identifier 316 can parse the COBOL programs to identify the copybooks associated with the VSAMS. The copybook identifier 316 generates a list of copybooks corresponding to the VSAM files. The copybook identifier 316 searches the copybook repository and obtains schema information from each copybook. The copybook identifier 316 maps each copybook to a DD name of the associated VSAM file.

The analysis module 236 outputs the copybook associated with the VSAM file, which is then fed into the copybook parsing module 242. The copybook parsing module 242 parses the copybook by searching the partitioned data set (PDS) for copybooks and extracting the schema information from the copybooks. The copybook parsing module 242 converts the schema information to a tabular format.

The copybook parsing module 242 outputs metadata file 333 to the metadata catalog 204. In some examples, the metadata file 333 is stored on USS (e.g., the USS 210). The metadata file 333 can include the VSAM File name, and corresponding column names and data types. The metadata catalog 304 can include a collection of multiple metadata files 333, with each metadata file 333 representing a VSAM file or a VSAM dataset.

In some examples, the metadata catalog 204 can be exposed to end users as a mapping interface. In some examples, the metadata catalog represents the VSAM files as a table. In some examples, the user 112 can view the metadata catalog 204 (e.g., as presented through a user interface of the client device 102). By referencing the metadata catalog 204, the user 112 can write conditional queries using sequences of data in the table.

The metadata catalog 204 can include data representing, for example, a number of VSAM files, names of the files, and file sizes. For each VSAM file or dataset, the metadata catalog 204 can include data indicating the number of columns, column names, column, length, data types, primary key, nullable and uniqueness, dataset owner, and creation date time of VSAM files.

In some examples, the discovery process, as illustrated in FIG. 3, is repeated at regular intervals. For example, the discovery process can be scheduled to repeat at specified time intervals in order to refresh the metadata catalog 204. The discovery process can be repeated, for example, at intervals of days or weeks. In some examples, a user (e.g., the user 112) can define a refresh schedule for the metadata catalog 204.

In some examples, the discovery process can include monitoring the VSAM files 215 for changes. In response to detecting a change to the VSAM files 215, the discovery engine 240 can perform the discovery process. For example, the discovery engine 240 may determine that files have been added or removed from the VSAM files 215. In response to detecting added or removed files, the discovery engine 240 can perform the discovery process. In this way, the discovery engine 240 can perform occasional refreshes of the metadata catalog 204 in order to maintain currency of the metadata catalog 204.

In some examples, the discovery process can be repeated on-demand. For example, the user 112 may provide a request to refresh the metadata catalog 204. In response to receiving the request to refresh the metadata catalog 204, the discovery process can repeat.

Figure 4:
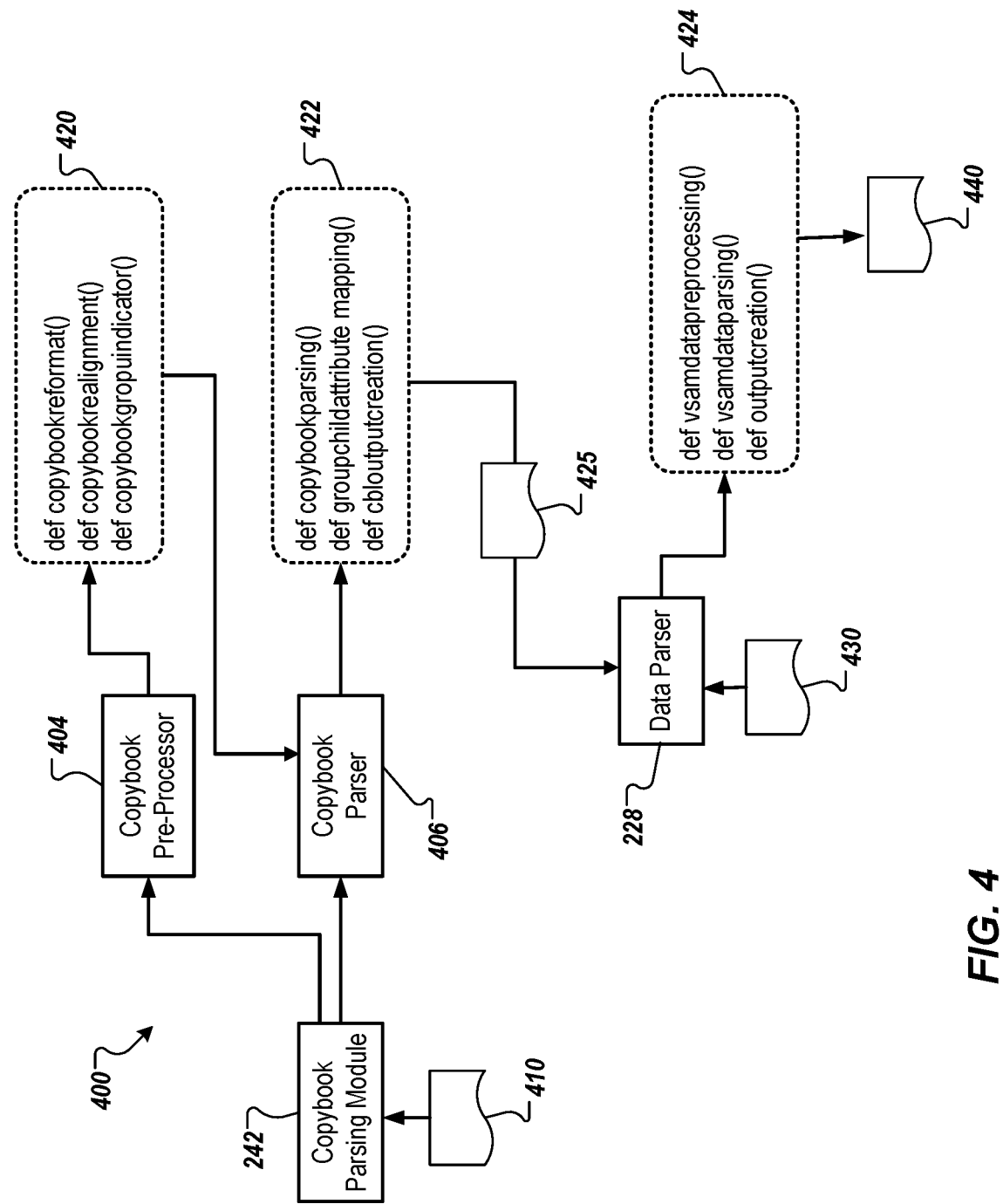
FIG. 4 depicts an example technical implementation of data parsing in accordance with implementations of the present disclosure.

FIG. 4 depicts an example technical implementation 400 of data parsing in accordance with implementations of the present disclosure. In the example of FIG. 4, the technical implementation 400 includes a copybook parsing module 242, a copybook pre-processor 404, a copybook parser 406, and the data parser 228. In some examples, any of the copybook parsing module 242, the copybook pre-processor 404, the copybook parser 406, or the data parser 228 can be a component of the USS 210 (e.g., components of the dataframe 230).

The technical implementation 400 can be implemented to parse the copied VSAM files 216 from the data files 222 into the dataframe 230. The technical implementation 400 can be used to parse copybooks identified in the metadata catalog 204 to identify schema in the copybooks. In this way, the technical implementation 300 can obtain, from the metadata catalog 204, schema information, and parse the copies of the selected VSAM files into tables using the schema information.

The copybook parsing module 242 receives a copybook file 410 (e.g., provided as a text document). The copybook file 410 is processed through the copybook pre-processor 404 using a first functionality 420. The first functionality 420 can remove additional information from the copybook file, realign the copybook file to a specific format by adding and removing spaces, and adding default field length if missing.

In some examples, to perform copybook pre-processing, the COBOL copybook is first replicated to USS from z/OS for pre-processing. Then the USS-version of the copybook is converted into a format suitable for metadata extraction. Pre-processing can include rule-based format validation, data type & length validation, and re-formatting. Once pre-processing is complete, a new copybook file is created. Re-formatted copybooks can be stored in the USS for future use for VSAM file parsing.

The copybook pre-processor 404 provides the pre-processed copybook file to the copybook parser 406. The copybook parser 406 processes the input using a second functionality 422. The second functionality 422 can parse a copybook to identify attributes of the copybook, concatenate child attributes against group attributes, and create a parsed copybook output file 425.

The parsed copybook output file 425 can be processed in the dataframe to extract the list of columns along with datatypes and column length. This information can then be used to parse the VSAM files.

The copybook parsing module 242 can routinely check for the last modified time-stamp of the copybooks in the PDS. In some examples, the copybook parsing module 242 can check for the last modified timestamp at regular intervals based on a schedule. The interval duration can be flexible and can be based on project requirements. If there is a change in the last modified date, the copybook parsing module 242 can re-run the copybook parsing to obtain the updated metadata information and refresh the re-formatted copybook stored in the USS.

The second functionality 422 outputs the parsed copybook output file 425 to the data parser 228. In some examples, the performance of copybook parsing is schedule-based. Copybook parsing schedules can be time-based, interval-based, and/or event-based.

The data parser 228 receives the parsed copybook output file 425 as input from the copybook parser 406. The data parser 228 also receives a copied VSAM file 430 (e.g., provided as a text document). The data parser 228 processes the copied VSAM file 430 and the parsed copybook output file 425 using a third functionality 424.

The third functionality 424 can pre-process the copied VSAM file 430, parse the VSAM file 430 against copybook attributes, and create a parsed VSAM output file 440. The VSAM file 430 can be parsed by converting the VSAM file into a tabular format. In some examples, parsing the VSAM file includes reading the VSAM file line-by-line and decomposing each line into columns based on the metadata extracted from copybook parsing. The VSAM file and the corresponding copybook can then be used to create a structured dataset.

The data parser 228 outputs the parsed VSAM output file 440. In some examples, the data parser 228 provides the parsed VSAM output file 440 (e.g., as a comma-separated values (CSV) document, as an Excel document). In some examples, the parsed VSAM output file 440 can be stored on the USS for re-use in executing future queries.

Figure 5:
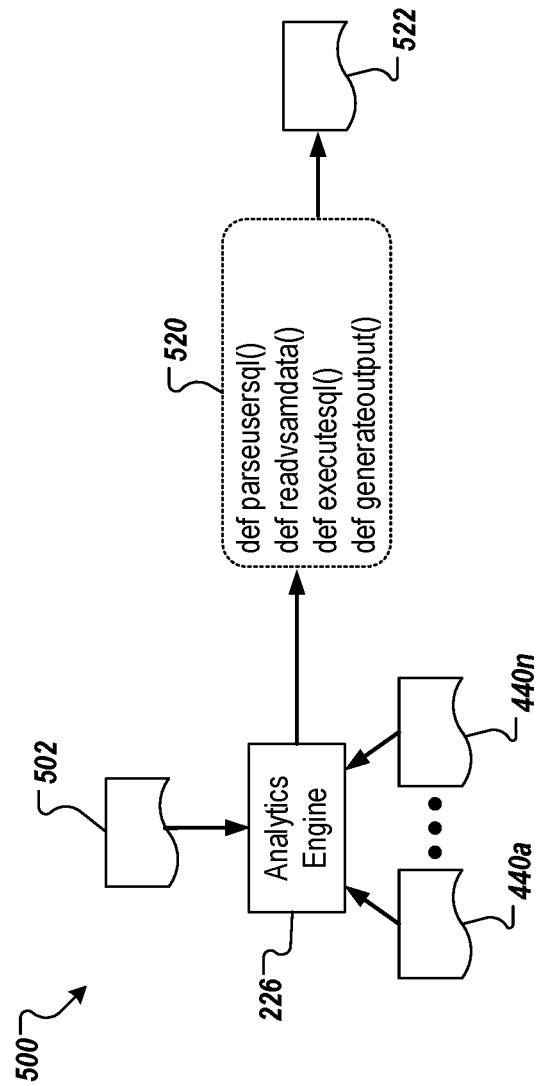
FIG. 5 depicts an example technical implementation of VSAM analytics in accordance with implementations of the present disclosure.

FIG. 5 depicts an example technical implementation 500 of VSAM analytics in accordance with implementations of the present disclosure. In the example of FIG. 5, the technical implementation 500 includes the analytics engine 226. In some examples, the analytics engine 226 is a component of the USS 210 (e.g., a component of the dataframe 230).

The technical implementation 500 can be implemented to perform on-demand analytics of parsed VSAM files. The analytics engine 226 receives, as input, a query file 502 (e.g., representing the query 202). The query file 502 can be provided, for example, as a CSV document or an Excel document. In some examples, the query data can include structured query language (SQL) query data.

The analytics engine 226 also receives, as input, parsed VSAM output files 440a-n. The parsed VSAM output files 440a-n can include any number of parsed VSAM output files (e.g., provided by the data parser 228). The parsed VSAM output files 440a-n can each be provided, for example, as a CSV document or as an Excel document.

The analytics engine 226 processes the query file 502 and the parsed VSAM output files 440a-n using a fourth functionality 520. The fourth functionality 520 can parse the user query to identify required ingest tables, read data of query-specific tables into the dataframe 230, execute the user query onto the dataframe 230, and generate an output file from the executed query. The fourth functionality 520 outputs an analytics output file 522 (e.g., provided as a CSV document, an Excel document). In some examples, the analytics output file 522 can be used to provide query results 232 to user 112 through the client device 102. Thus, the analytics engine 226 can be used to generate query results 232 from multiple copied VSAM files, for example, from combined data from two or more VSAM files.

Figure 6:
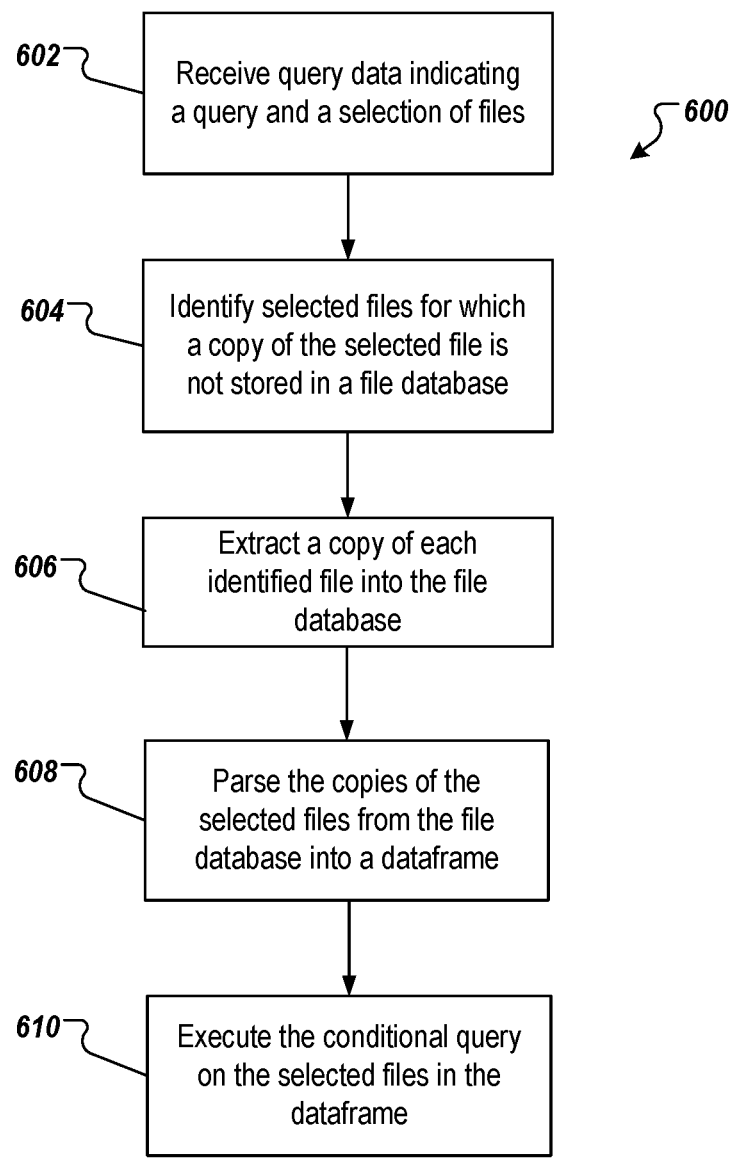
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

Query data indicating a query and a selection of files is received (602). For example, and as described herein with reference to FIG. 2, the query 202 is received from the client device 102 by the USS 210. With reference to FIG. 5, in some examples, the query 202 can be provided as a query file 502. The query 202 can include a conditional query and a selection of identified files on which to execute the conditional query. The selection of identified files can include selected VSAM files 215 that are represented in the metadata catalog 204.

Selected files, for which a copy of the selected file is not stored in a file database, are identified (604). For example, and as described herein, the command module 208 can receive data indicating available files 224 that are stored by the USS 210 or that have been copied to the USS 210. The command module 208 can determine which of the selected files identified by the query 202 are included in the available files 224, and which of the selected files are not included in the available files 224.

A copy of each identified file into the file database is extracted (606). For example, and as described herein, the command module 208 can issue copy commands 212 to copy the selected files that were identified as not being included in the available files 224. The USS 210 can thus obtain copies of VSAM files 215 that are identified in the query 202 and that are not available in the data files 222. The copied VSAM files 216 can be stored by the USS 210.

The copies of the selected files from the file database are parsed into a dataframe (608). For example, and as described herein, the data parser 228 can parse copied VSAM files 216 into the dataframe 230. Referring to FIG. 4, the data parser 228 can receive, as input, a copied VSAM file 430, and can output a parsed VSAM output file 440.

The conditional query is executed on the selected files in the dataframe (610). For example, and as described herein, the analytics engine 226 can execute the query 202 on the parsed files. The analytics engine 226 can receive, as input, a parsed VSAM output file 440, and can output an analytics output file 522. Query results 232 (e.g., including the analytics output file 522) can be provided to the user 112 through the client device 102.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer implemented method for executing queries on files stored within a mainframe system, the method being executed by one or more processors and comprising:
   extracting, by a UNIX Systems Services (USS) application operating within the mainframe system, Virtual Storage Access Method (VSAM) file names from catalog files;
   identifying, by the USS application and based on the VSAM file names, associated copybooks within a z/OS operating system operating within the mainframe system;
   generating, by the USS application, metadata for a plurality of VSAM files based on the associated copybooks;
   generating, by the USS application, a metadata catalog based on the metadata for the plurality of VSAM files;
   receiving, by the USS application operating within the mainframe system, query data based on the generated metadata catalog, the query data indicating a conditional query and a selection of a set of VSAM files of the plurality of VSAM files on which to execute the conditional query;

identifying, by the USS application, a subset of the selected set of VSAM files for which copies of the selected set of VSAM files are not stored in a file database of the USS application;

extracting, by the USS application and from a VSAM file system hosted by the z/OS operating system operating within the mainframe system, a copy of each file of the subset of the selected set of VSAM files into the file database of the USS application;

parsing, by the USS application, the copies of the selected set of VSAM files from the file database into a dataframe operating within the USS application;

executing, by the USS application, the conditional query on the parsed selected set of VSAM files in the dataframe; and providing, by the USS application, a result of the conditional query based on the execution of the conditional query.

2. The method of claim 1, further comprising:
executing, by a discovery engine of the USS application, a discovery process to provide the metadata comprising, for a VSAM file of the plurality of VSAM files in the VSAM file system:
a name of the VSAM file;
corresponding column names and data types; and
a file alias.

3. The method of claim 1, wherein parsing the copies of the selected set of VSAM files from the file database into the dataframe comprises:
obtaining, from the metadata catalog representing files in the VSAM file system, schema information; and
parsing the copies of the selected set of VSAM files into tables using the schema information.

4. The method of claim 1, further comprising:
storing, by the USS application, historical query data including query data received over time.

5. The method of claim 1, further comprising:
based on determining that at least a threshold amount of time has passed after extracting a copy of a particular selected file of the subset of the selected set of VSAM files into the file database, deleting, from the file database, the copy of the particular selected file.

6. The method of claim 1, wherein executing the conditional query on the selected files in the dataframe comprises executing the conditional query on combined data from two or more of the selected files.

7. The method of claim 1, wherein the dataframe comprises a Python dataframe.

8. The method of claim 1, wherein VSAM files of the VSAM file system are stored on a direct access storage device (DASD).

9. The method of claim 1, wherein the catalog files include data representing VSAM attributes of the plurality of VSAM files in an unstructured format.

10. The method of claim 1, wherein the query data including the conditional query is received at a first instance, and wherein the method further comprising:
determining, by the USS application, data access pattern of the conditional query based on frequency of reception of the conditional query historically; and
generating, by the USS application, copy command to copy the set of VSAM files from the VSAM file system to the file database of the USS application prior to reception of the conditional query at a second instance subsequent to the first instance.

11. The method of claim 1, further comprising:
deleting, from the file database, at least one VSAM file of the copies of the subset of the selected set of VSAM files, based on determining that the at least one VSAM file is queried less frequency than other VSAM files of the copies of the subset of the selected set of VSAM files.

12. A non-transitory computer-readable storage medium coupled to one or more processors and having instructions stored thereon which, when executed by the one or more processors, cause the one or more processors to perform operations for executing queries on files stored within a mainframe system, the operations comprising:
extracting, by a UNIX Systems Services (USS) application operating within the mainframe system, Virtual Storage Access Method (VSAM) file names from catalog files;

identifying, by the USS application and based on the VSAM file names, associated copybooks within a z/OS operating system operating within the mainframe system;

generating, by the USS application, metadata for a plurality of VSAM files based on the associated copybooks;

generating, by the USS application, a metadata catalog based on the metadata for the plurality of VSAM files;

receiving, by the USS application operating within the mainframe system, query data based on the generated metadata catalog, the query data indicating a conditional query and a selection of a set of VSAM files of the plurality of VSAM files on which to execute the conditional query;

identifying, by the USS application, a subset of the selected set of VSAM files for which copies of the selected set of VSAM files are not stored in a file database of the USS application;

extracting, by the USS application and from a VSAM file system hosted by the z/OS operating system operating within the mainframe system, a copy of each file of the subset of the selected set of VSAM files into the file database of the USS application;

parsing, by the USS application, the copies of the selected set of VSAM files from the file database into a dataframe operating within the USS application;

executing, by the USS application, the conditional query on the parsed selected set of VSAM files in the dataframe; and providing, by the USS application, a result of the conditional query based on the execution of the conditional query.

13. The non-transitory computer-readable storage medium of claim 12, the operations further comprising:
executing, by a discovery engine of the USS application, a discovery process to provide the metadata comprising, for a VSAM file of the plurality of VSAM files in the VSAM file system:
a name of the VSAM file;
corresponding column names and data types; and
a file alias.

14. The non-transitory computer-readable storage medium of claim 12, wherein parsing the copies of the selected set of VSAM files from the file database into the dataframe comprises:
obtaining, from the metadata catalog representing files in the VSAM file system, schema information; and parsing the copies of the selected set of VSAM files into tables using the schema information.

15. The non-transitory computer-readable storage medium of claim 12, the operations further comprising:
storing, by the USS application, historical query data including query data received over time.

16. A system, comprising:
a computing device; and
a computer-readable storage device coupled to the computing device and having instructions stored thereon which, when executed by the computing device, cause the computing device to perform operations for executing queries on files stored within a mainframe system, the operations comprising:
extracting, by a UNIX Systems Services (USS) application operating within the mainframe system, Virtual Storage Access Method (VSAM) file names from catalog files;
identifying, by the USS application and based on the VSAM file names, associated copybooks within a z/OS operating system operating within the mainframe system;
generating, by the USS application, metadata for a plurality of VSAM files based on the associated copybooks;
generating, by the USS application, a metadata catalog based on the metadata for the plurality of VSAM files;
receiving, by the USS application operating within the mainframe system, query data based on the generated metadata catalog, the query data indicating a conditional query and a selection of a set of VSAM files of the plurality of VSAM files on which to execute the conditional query;
identifying, by the USS application, a subset of the selected set of VSAM files for which copies of the selected set of VSAM files are not stored in a file database of the USS application;
extracting, by the USS application and from a VSAM file system hosted by the z/OS operating system operating within the mainframe system, a copy of each file of the subset of the selected set of VSAM files into the file database of the USS application;
parsing, by the USS application, the copies of the selected set of VSAM files from the file database into a dataframe operating within the USS application;
executing, by the USS application, the conditional query on the parsed selected set of VSAM files in the dataframe; and
providing, by the USS application, a result of the conditional query based on the execution of the conditional query.

* * * * *